(12) United States Patent
Dias et al.

(10) Patent No.: US 6,658,710 B2
(45) Date of Patent: Dec. 9, 2003

(54) METHOD FOR FABRICATING AN ANNULAR RING TRANSDUCER

(75) Inventors: J. Fleming Dias, Menlo Park, CA (US); Richard D. Pering, Palo Alto, CA (US); Henry E. Karrer, Palo Alto, CA (US); Richard J. Pittaro, San Carlos, CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 205 days.

(21) Appl. No.: 09/888,742

(22) Filed: Jun. 25, 2001

(65) Prior Publication Data

US 2001/0045132 A1 Nov. 29, 2001

Related U.S. Application Data

(62) Division of application No. 09/298,335, filed on Apr. 23, 1999, now Pat. No. 6,298,735.

(51) Int. Cl.[7] .............................................. H04R 17/00
(52) U.S. Cl. ........................ 29/25.35; 29/592.1; 29/597; 73/194; 73/861.25; 310/369
(58) Field of Search .............................. 29/25.35, 592.1, 29/597; 73/861.25–861.29, 194; 310/369

(56) References Cited

U.S. PATENT DOCUMENTS

| | | | | |
|---|---|---|---|---|
| 3,653,259 A | * | 4/1972 | McShane | 73/861.27 |
| 4,162,630 A | * | 7/1979 | Johnson | 73/861.27 |
| 4,287,770 A | * | 9/1981 | Weyns | 73/632 |
| 4,706,229 A | * | 11/1987 | Congdon | 367/159 |
| 4,961,176 A | * | 10/1990 | Tanaka et al. | 367/155 |
| 5,052,230 A | * | 10/1991 | Lang et al. | 73/861.28 |
| 5,437,194 A | * | 8/1995 | Lynnworth | 73/861.27 |
| 5,515,733 A | * | 5/1996 | Lynnworth | 73/861.27 |

* cited by examiner

*Primary Examiner*—A. Dexter Tugbang
*Assistant Examiner*—Paul Kim (57) ABSTRACT

A method is provided for fabricating an annular ring transducers for determining the velocity of a fluid flow. A novel and accurate flow measurement system is fabricated for measuring transit time of a fluid flow using chirp signals, and a pneumotachometer with annular ring transducers is also disclosed.

5 Claims, 6 Drawing Sheets

METHOD FOR FABRICATING AN ANNULAR RING TRANSDUCER

CROSS REFERENCE TO RELATED APPLICATION(S)

This is a divisional of application Ser. No. 09/298,335, now U.S. Pat. No. 6,298,735, filed on Apr. 23, 1999.

TECHNICAL FIELD

The present invention relates generally to ultrasonic devices and more specifically to an ultrasonic pneumotachometer.

BACKGROUND ART

In the medical field, it is often necessary to measure the respired gas volume in a person. This gas volume is obtained by measuring the velocity of gas flow, breath by breath, and integrating the velocity over a defined period of time.

There are many methods of measuring the gas velocity. One such method involves the use of a Fleisch type pneumotachometer (flowmeter) that was invented in the 1920's. A Fleisch pneumotachometer includes a tube, two sets of screens to linearize the turbulent incoming gas flow to establish a region of laminar flow, and a pressure sensing transducer located between the screens. Since the pressure drop $\Delta p$ is proportional to the gas velocity, the gas velocity can be determined by measuring $\Delta p$ across the pressure sensing transducer. However, the Fleisch pneumotachometer works well only if the laminar regime is maintained. Turbulence causes $\Delta p$ to vary nonlinearly with gas flow and thus affects the accuracy of the gas velocity determined using a Fleisch pneumotachometer. Accumulation of saliva and/or effluent inside the tube from the person's lungs, particularly at the screens, will cause turbulence to occur. In general, to overcome the nonlinear effects, different diameter tubes are used to cover a range of up to 20 liters per second (1/sec).

Since the availability of lead titanate zirconate (PZT) piezoelectric material, ultrasonic flowmeters are now available, and are in common use for various applications. PZT is a piezoelectric material, which can be used to generate ultrasonic waves at different frequencies. In these pneumotachometers, the velocity of gas flow is determined by measuring the transit time of an ultrasound wave through a gas volume. However, accumulation of spit and other pulmonary effluents from a person's lungs tend to block the wells in front of the transducers, making the pneumotachometer unreliable in those situations. Also, since such a pneumotachometer often uses small and single transducers, there is always a likelihood that the transducers could be totally blocked, causing the transducer to stop acquiring data. It would therefore be very beneficial to the art if the transducer output could be desensitized to such dropouts of the signal acquisition.

A solution, which would provide an accurate and reliable pneumotachometer for determining the velocity of a fluid flow, has been long sought but has eluded those skilled in the art.

DISCLOSURE OF THE INVENTION

The present invention provides an accurate and reliable pneumotachometer for determining the velocity of a fluid flow.

The present invention provides a pneumotachometer with annular ring transducers for determining the velocity of a fluid flow.

The present invention further provides a method for fabricating an annular ring transducer.

The present invention still further provides a novel and accurate flow measurement system as used with a pneumotachometer having annular ring transducers constructed in accordance with the present invention.

The above and additional advantages of the present invention will become apparent to those skilled in the art from a reading of the following detailed description when taken in conjunction with the accompanying drawings.

BEST MODE FOR CARRYING OUT THE INVENTION

The present invention provides an accurate and reliable pneumotachometer by using a novel transducer design and a novel differential period measuring technique for determining the velocity of a fluid flow.

Figure 1:
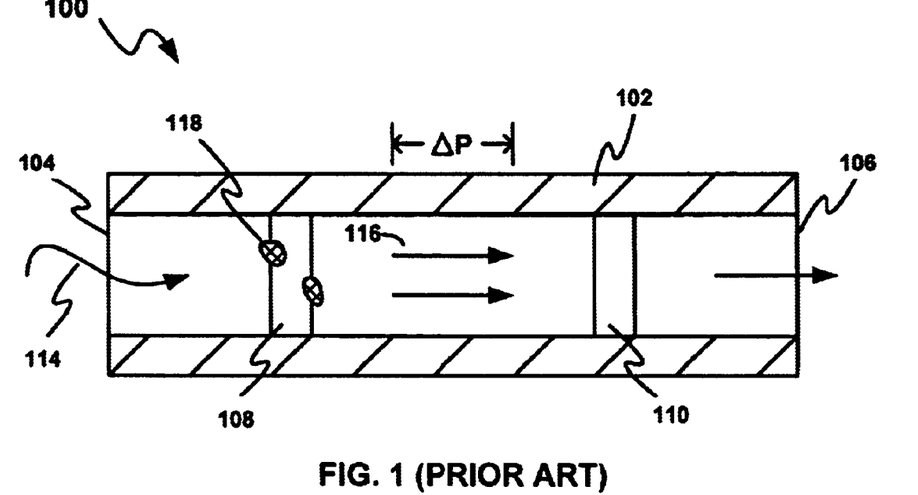
FIG. 1 (PRIOR ART) is a sectioned view of a typical Fleisch type pneumotachometer.

Referring now to FIG. 1 (PRIOR ART), therein is shown a Fleisch type pneumotachometer 100. The pneumotachometer 100 generally includes a tube 102 having two ends 104 and 106, screens 108 and 110, and pressure-sensing transducers (not shown) positioned between the screens 108 and 110. Gas flow 114, such as from a person's breath, propagates through screen 108. Screen 108 converts the gas flow 114 that is typically a turbulent flow into a laminar flow 116. When a laminar flow is established, the pressure drop $\Delta p$ is proportional to the gas velocity. Therefore, the gas velocity can be determined by measuring $\Delta p$ across the pressure sensing transducers. As explained in the BACKGROUND ART, the accuracy of the Fleisch type pneumotachometer is adversely affected by turbulent flow between the screens 108 and 110 due to the accumulation inside the tube 102 of saliva and/or effluent 118 from the person's lung, particularly at the screen 108.

Figure 2:
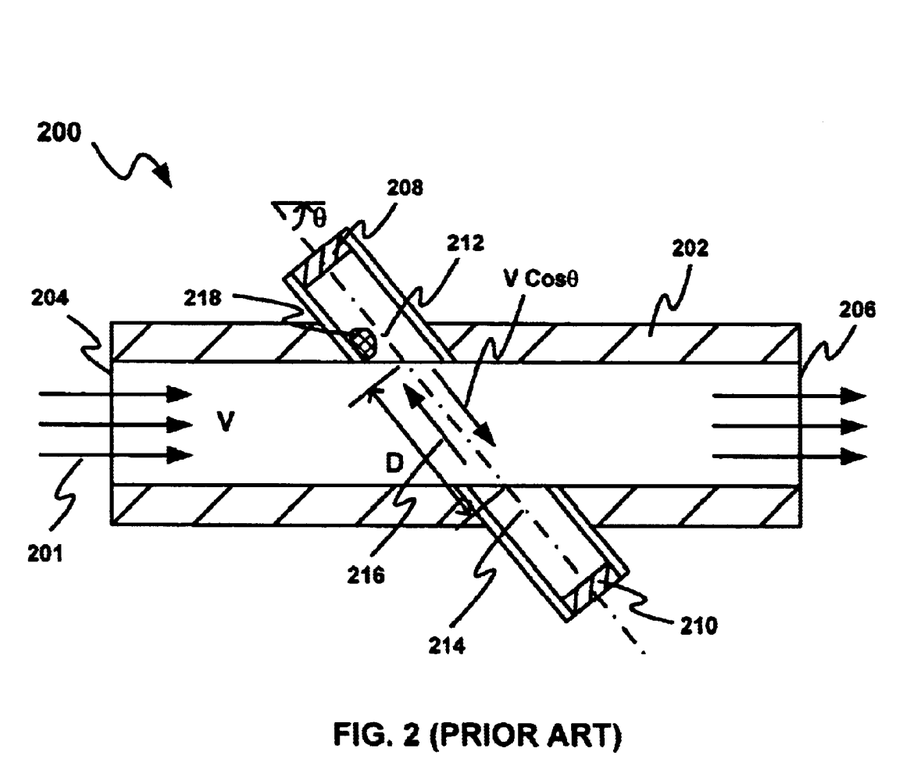
FIG. 2 (PRIOR ART) is a sectioned view of an ultrasonic pneumotachometer.

Referring now to FIG. 2 (PRIOR ART), therein is shown a pneumotachometer 200 using ultrasound to measure the velocity V of gas flow 201, by measuring the transit time of an ultrasound wave through a gas volume. The pneumotachometer 200 includes a tube 202 having two ends 204 and 206, a first lead titanate zirconate (PZT) transducer 208 and a second PZT transducer 210 located in a first transducer well 212 and a second transducer well 214, respectively. The first and second PZT transducers 208 and 210 are positioned at an angle Θ to the tube 202. Ultrasonic pulses 216 travel between the first and second PZT transducers 208 and 210 at a speed of $V_{us}$. In operation, the first PZT transducer 208 fires towards the second transducer 210, and vice versa.

Transit Time $T_{12}$ from the first PZT transducer 208 to the second PZT transducer 210 corresponding to a distance D is given by:

$$T_{12} = \frac{D}{V_{us} + V\cos\Theta} \quad (1)$$

Transit Time $T_{21}$ from the second PZT transducer 210 to the first PZT transducer 208 corresponding to a distance D is given by:

$$T_{21} = \frac{D}{V_{us} - V\cos\Theta} \quad (2)$$

The difference in transit time Δt is given by, $$\Delta t = \quad (3)$$

$$T_{21} - T_{12} = \frac{D}{V_{us} - V\cos\Theta} - \frac{D}{V_{us} + V\cos\Theta}$$

$$\Delta t = \frac{D(V_{us} + V\cos\Theta) - D(V_{us} - V\cos\Theta)}{(V_{us} - V\cos\Theta)(V_{us} + V\cos\Theta)}$$

$$= \frac{D(V_{us} + V\cos\Theta - V_{us} + V\cos\Theta)}{V_{us}^2 - V^2\cos^2\Theta}$$

$$= \frac{2DV\cos\Theta}{V_{us}^2 - V^2\cos^2\Theta} \quad (4)$$

if $V \ll V_{us}$, then $V^2\cos^2\Theta$ can be neglected, and it follows that, $$\Delta t \cong \frac{2D\cos\Theta}{V_{us}^2} V \quad (5)$$

Equation 5 shows that Δt is proportional to the flow velocity V, if D, Θ, and $V_{us}$ remain constant. The variations in these quantities are a function of the ambient temperature and, to a lesser extent, of the deformation stresses on the pneumotachometer. The temperature effects are to a great degree cancelled because the ultrasound pulses 216 travel in opposite directions through the same gas volume.

One significant drawback of the prior art pneumotachometer is that accumulation of spit and other pulmonary effluents 218 from a person's lungs tend to block the first and second transducer wells 212 and 214 in front of the first and second PZT transducers 208 and 210, respectively, making the pneumotachometer unreliable in those situations because it cannot accurately measure the transit time. Furthermore, since only small and single transducers (such as first PZT transducer 208 and second PZT transducer 210) are used, there is always a likelihood that one or both transducers could be totally blocked, causing the transducer(s) to stop acquiring data.

The present invention overcomes the above stated disadvantage of a prior art pneumotachometer by using a novel transducer design and a novel differential period measuring technique.

Figure 3:
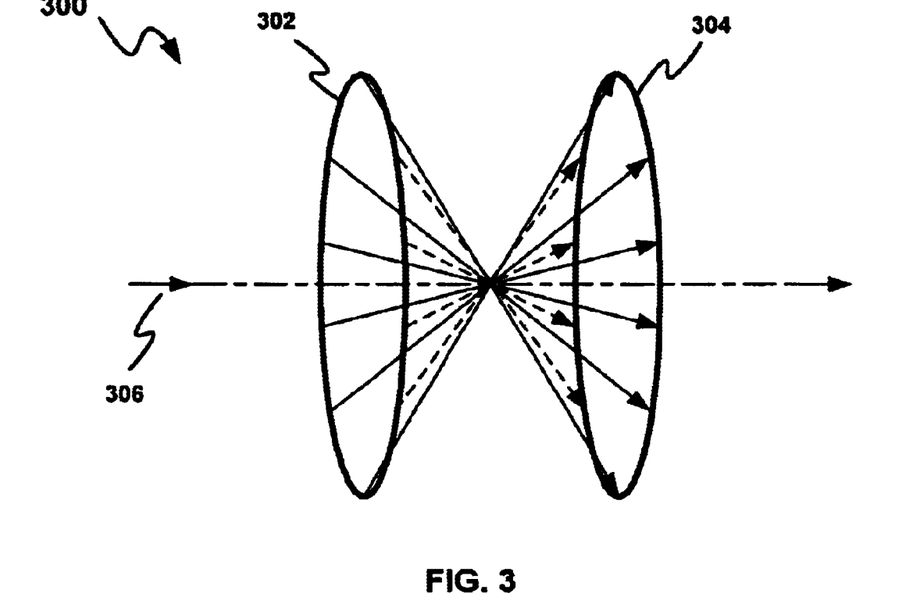
FIG. 3 is a diagrammatic representation of a pneumotachometer constructed in accordance with the present invention.

I. Introduction to the Annular Ring Transducer Constructed in Accordance with the Present Invention Referring now to FIG. 3, therein is shown a diagrammatic representation of a pneumotachometer 300 constructed in accordance with the present invention. Pneumotachometer 300 includes annular ring transducers 302 and 304 that are poled at an angle to the gas flow direction. The poled direction of annular ring transducers 302 and 304 is defined by the angulation of its active transducer face (not shown). Annular ring transducer 302 is shown firing ultrasonic pulses 306 at annular transducer 304. The direction is defined by the angulation of the active transducer face. The frequency of the pulses is defined by the thickness (not shown) of the angulated section of the transducer face. Although the thickness is generally uniform, it could taper within limits to make the transducer efficient for a broader band of frequencies.

Figure 4:
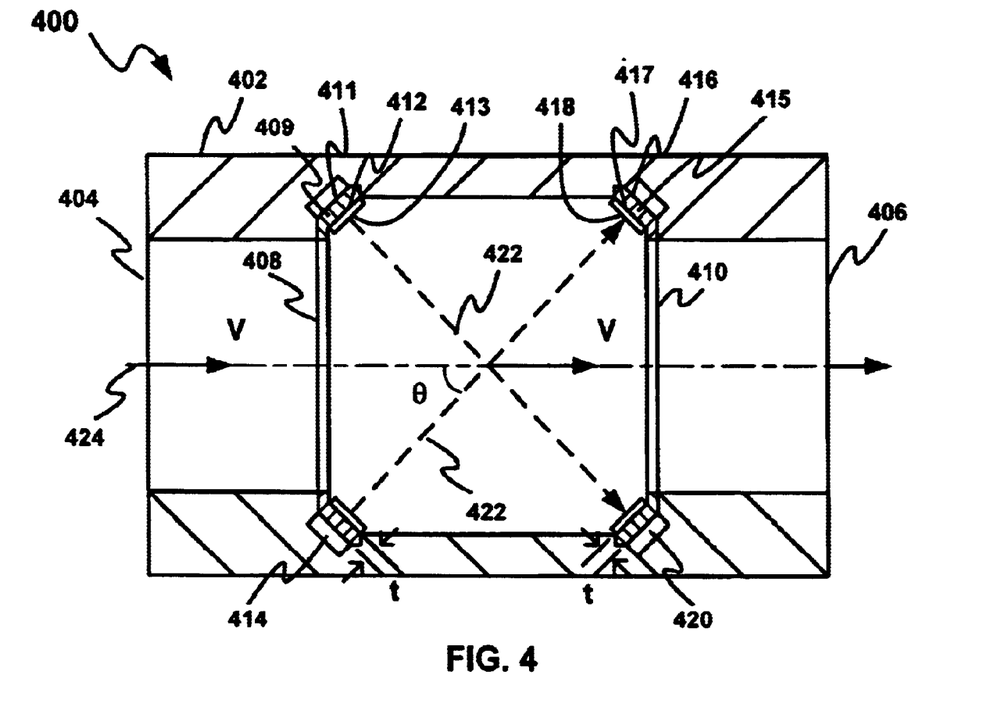
FIG. 4 is a sectioned view of a pneumotachometer tube constructed in accordance with the present invention.

Referring now to FIG. 4 therein is shown the longitudinal cross section of a pneumotachometer 400 constructed according to the present invention. Pneumotachometer 400 includes a hollow tubular member 402 with a first end 404 and a second end 406, and a first annular ring transducer 408 and a second annular ring transducer 410 disposed in a spaced-apart relationship disposed in the tubular member 402. The first annular ring transducer 408 includes a first angled ring transducer 409 that is poled at an angle Θ that is about 45°. The first angled ring transducer 409 further includes a first slanted outer face 411 and a first slanted inner face 412. Disposed on top of the first slanted inner face 412 is a low impedance matching layer 413. The first annular ring transducer 408 is bonded to and supported by an impedance matched, acoustic absorber backing 414. Similarly, the second annular ring transducer 410 includes a second angled ring transducer 415 that is poled at an angle Θ that is about 45°. The second angled ring transducer 415 further includes a second slanted outer face 416 and a second slanted inner face 417. Disposed on top of the second slanted inner face 417 is a low impedance matching layer 418. The second annular ring transducer 415 is bonded to and supported by an impedance matched, acoustic absorber backing 420. Ultrasonic pulses 422 are shown firing from the first annular ring transducer 408 towards the second annular ring transducer 410. Gas flow 424 with a gas velocity V travels from the first end 404 towards the second end 406. The component of gas velocity V is shown resolved in a direction collinear with the direction of the ultrasonic pulses 422. The annular ring transducers 408 and 410 as shown are of uniform thickness t. In a different embodiment of the present invention, the thicknesses t could be made to vary along the circumference. This variation will activate the annular ring transducers at slightly different frequencies, allowing it to be operated in a broad-banded mode. Matching layers 413 and 418 are of optimum impedance and transmission loss and are used to provide the desirable type of broad banding.

The PZT piezoelectric materials used for the annular ring transducers should preferably have minimal coupling in the direction orthogonal to the thickness direction, in order to discourage the generation of circumferential modes, which could interfere with the accuracy of the transit time measurement. To achieve this, the angled ring transducers 409 and 415 may be serrated into a plurality of segments (not shown). Each serration includes a groove on the first and second slanted faces 411 and 416 and is formed to a predetermined depth into the first and second angled ring transducers 409 and 415. The annular metalization (not shown) on one face for application of the excitation voltage would be continuous while the other on each segment would be electrically coupled to its immediately adjacent segments by using, for example, electrically conductive jumpers.

With the use of first and second annular ring transducers 408 and 410, no transducer well is required. Therefore, the problem associated with the prior art pneumotachometer due to the accumulation of spit and other pulmonary effluents 218 from a person's lungs at transducer wells is eliminated. Furthermore, the active transducer faces of the annular ring transducers 408 and 410 are much larger than the small and single transducers (such as first PZT transducer 208 and second PZT transducer 210 shown in FIG. 2 (PRIOR ART)) used in the prior art pneumotachometer. The use of transducers with a larger active transducer face help to minimize any potential blockage problem. Accordingly, a pneumotachometer with annular ring transducers constructed in accordance with the present invention is more accurate and reliable.

II. Construction of Annular Ring Transducers Using a PZT Piezoelectric Member in Accordance with the Present Invention Referring now to FIGS. 5A and 5B, therein are shown a plan view and a cross-section of the end view, respectively of an annular ring transducer 500 constructed in accordance with the present invention. The annular ring transducer 500 includes a cylindrical piece of PZT piezoelectric member 502 with a hollow center portion 503. The hollow center portion 503 has a radius of r. The annular ring transducer 500 includes an angled ring transducer 504. The angled ring transducer 504 includes a slanted outer face 506 and a slanted inner face 508. The slanted inner face 508 is located at a distance from the center of the PZT member 502 that is larger than or equal to r. The thickness of the angled transducer 504 between the slanted outer face 506 and the slanted inner face 508 is equal to t.

Figure 5A:
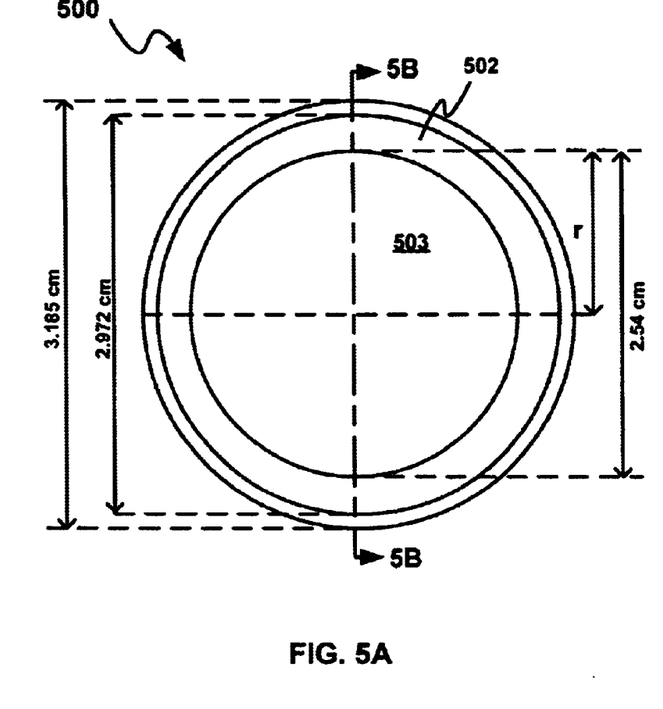
FIG. 5A is a plan view and a section view of an annular ring transducer constructed in accordance with the present invention.
Figure 5B:
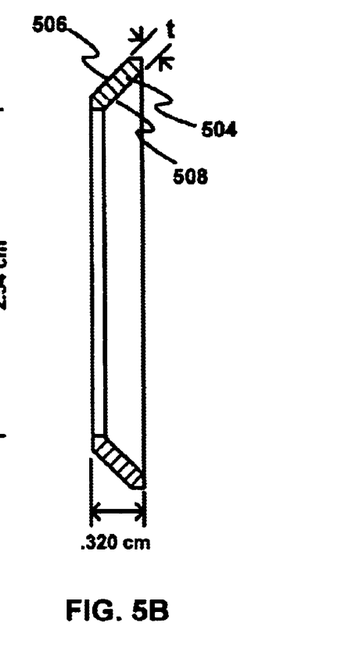
FIG. 5B is a section view of an annular ring transducer constructed in accordance with the present invention.

In production, a cylindrical piece of PZT 5A (puck) piezoelectric (PZT) member 502 with an outer diameter greater than 3.185 cm and an overall thickness greater than 0.320 cm is provided.

Next, a ceramist's lathe is used to reduce the outer diameter of the PZT member 502 to 3.185 cm and its thickness to 0.320 cm using diamond grit wheels, a technology that is well understood in the field of manufacturing PZT transducers.

Thereafter, a slanted outer face 506 is formed with an angle of 45° by using the same lathe.

After the formation of the slanted outer face 506, a hollow center portion 503 is formed with a diameter of 2.540 cm. The hollow center portion 503 will function as a central flow hole.

Next, a slanted inner face 508 is formed by grinding the inner portion of the PZT member 502, until the thickness t is 0.157 cm. The portion of the PZT member 502 that is positioned between the slanted outer face 506 and the slanted inner face 508 forms an angled ring transducer 504. The thickness t defines the resonant frequency of the completed annular ring transducer, and is given by, $$f = \frac{V_{(PZT)}}{[2t]} \quad (6)$$

where $V_{PZT}$ is the ultrasonic velocity of propagation in PZT 5A.

A typical value for $V_{PZT}$ is about 4350 m/sec.

After the formation of the slanted inner face 508, the angular ring transducer 500 is metalized by vacuum depositing a base layer of 600 Å of chrome, and a top layer of 3000 Å of gold onto the slanted outer face 506 and the slanted inner face 508.

The annular ring transducer 500 is now ready to be poled. The annular ring transducer 500 is mounted in a suitable poling fixture that is capable of providing high voltage to the slanted outer face 506 and the slanted inner face 508. The poling fixture with the annular ring transducer 500 is then inserted in a transformer oil bath equipped with a built-in stirrer and a heater. The oil bath is then heated to a first temperature that is below the Curie temperature (350° C. for PZT 5A). A voltage of 4000 volts (V) is then applied between the slanted outer face 506 and the slanted inner face 508, i.e., an electric field of about 2548 V/mm. The annular ring transducer 500 is kept in the heated bath at 100° C. for 30 minutes with the bath being stirred all the time. At the end of 30 minutes, the bath is allowed to cool down to room temperature with the voltage applied to the slanted outer face 506 and the slanted inner face 508 during the cool down period. After the bath is cooled down to room temperature, the voltage is removed and the annular ring transducer 500 is removed from the bath. The annular ring transducer 500 is removed from the fixture and is then washed in acetone and alcohol.

It should be noted that the voltage that is needed to be applied between the slanted outer face 506 and the slanted inner face 508 for a given angled ring transducer with thickness t is approximately 60 V per t, where t is expressed in thousandths of an inch (0.001").

Figure 6:
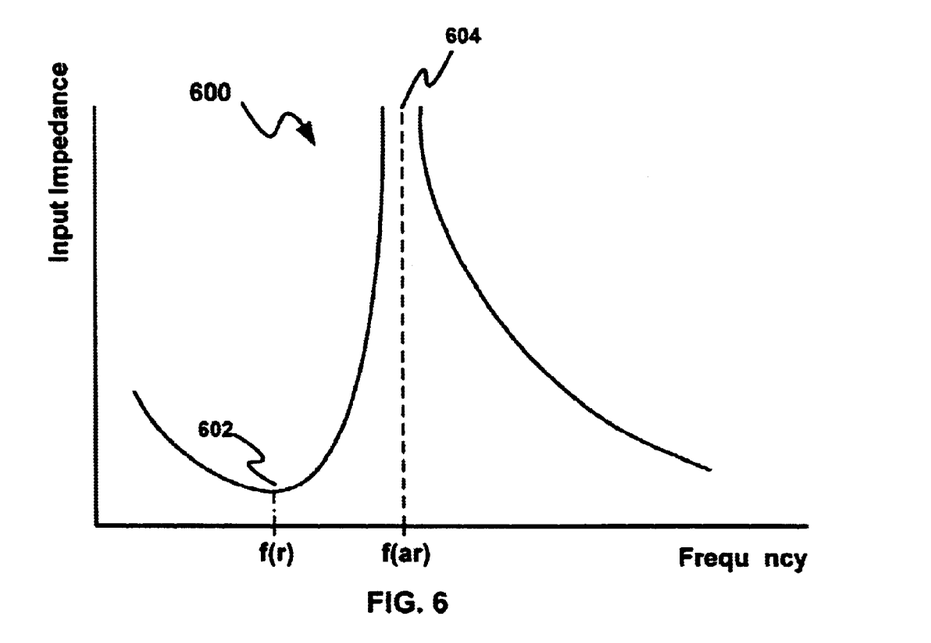
FIG. 6 is the input impedance characteristics of the annular ring transducer of FIG. 5.

Referring now to FIG. 6, therein is shown the input impedance characteristics of annular ring transducer 500 formed in accordance with the present invention.

After the poling steps, the annular ring transducer 500 is then tested by measuring the input impedance on a vector impedance meter. The response should show a distinct resonance peak 602 and an anti-resonance peak 604. With that plot, the thickness-mode coupling coefficient (effective coupling coefficient) is calculated using the values of the resonant frequency which corresponds to the resonant peak 602 and the anti-resonant frequency which corresponds to the anti-resonance peak 604 in the formula shown below:

$$EffectiveCouplingCoefficient = \left[ \frac{[f(ar)]^2 - [f(r)]^2}{[f(ar)]^2} \right]^{1/2} \quad (7)$$

The effective coupling coefficient should be approximately 0.49.

III. Construction of Annular Ring Transducers Using a Polyvinylidene Fluoride (PVDF) Piezoelectric Member in Accordance with the Present Invention PVDF has a much lower acoustic impedance than PZT, and can be used to interface with air reasonably well without using additional matching layers. The acoustic impedance may be further reduced by geometrically patterning impedance matching material directly onto a radiating surface of piezoelectric substrate as described in U.S. Pat. No. 5,511,296 to Dias et al., which are assigned to the assignee of the present invention, and is hereby incorporated by reference.

An annular ring transducer can be formed by stretching a PVDF film over a metal ring of the same shape and size as the annular ring transducer 500 of FIG. 5. A first ring is prepared from aluminum stock. Next, a second ring that mates with the inclined surface of the first ring is generated. The mating surfaces are then polished and plated. The second ring should preferably be of a material to which an epoxy adhesive does not adhere. A layer of epoxy adhesive is then applied to an active face of the first ring. The PVDF film is introduced between the mating surfaces of the first ring and the second ring. The first and the second rings are then pressed against one another using two compliant pads such as rubber pads till the excess epoxy adhesive is squeezed out. The epoxy adhesive is then cured at a specified temperature. It should be noted that the PVDF film has to be coated with a vacuum deposited chrome-gold (Cr—Au) film, to enhance adhesion to the first ring and to provide good electrical connection to the second ring. After the epoxy adhesive is cured, any extra film is cut out or punched out to form an annular ring transducer. The annular ring transducer may be repoled if necessary.

IV. A First Embodiment of a Flow Measurement System Using a Pneumotachometer With Annular Ring Transducers The computation of the volume flow rate involves the accurate determination of the velocity of the gas flow. In an ultrasonic pneumotachometer this involves the accurate determination of the transit time between the annular ring transducers 500 described in FIGS. 5A and 5B and as used in the pneumotachometer 400 shown in FIG. 4. In a recent article entitled "A Pulsed Diagonal Ultrasonic Airflow Meter," Buess, Pletsch, Guffenbuhl, Journal of Applied Physiology, 1986, 61(3) 1195–1199, a new ultrasonic airflow meter is described. The disclosure therein is hereby incorporated by reference. The electronic design described therein is used to illustrate the operation of a pneumotachometer constructed in accordance with the present invention.

Figure 7:
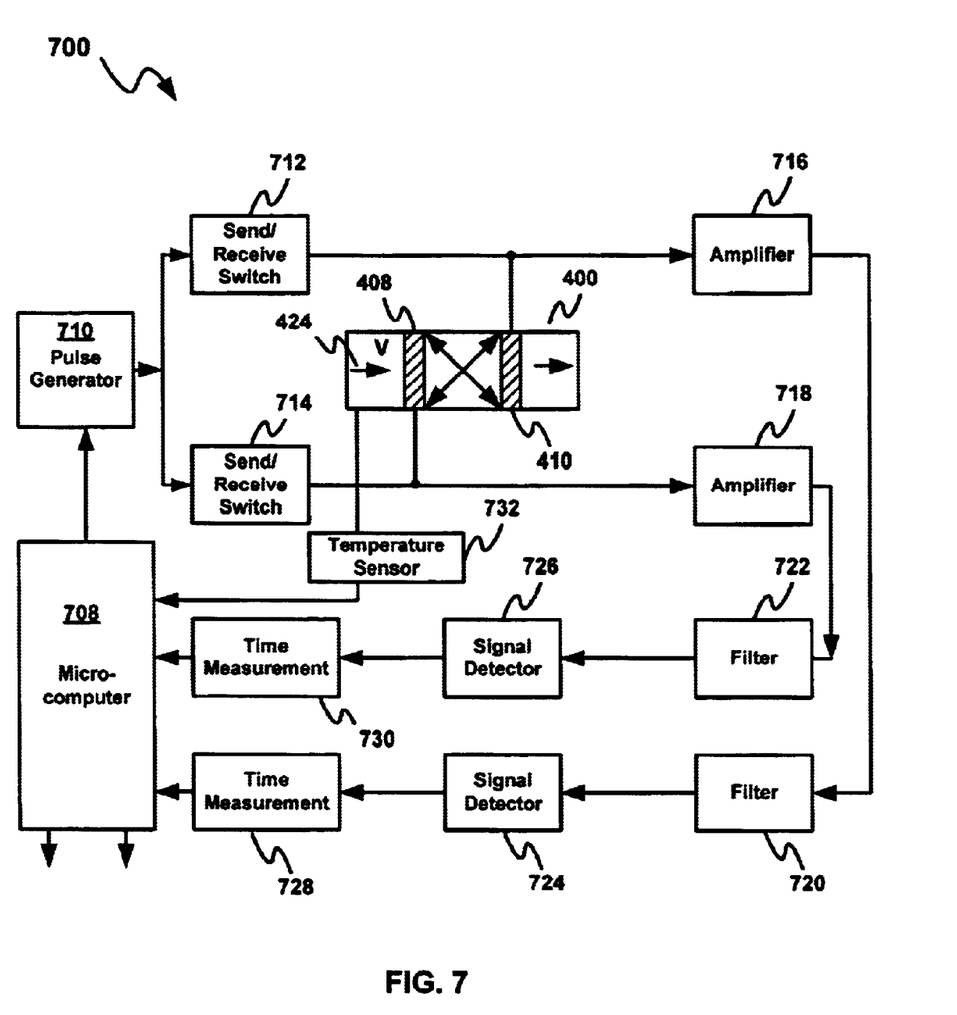
FIG. 7 is a first embodiment of a pneumotachometer having annular ring transducers constructed in accordance with the present invention.

Referring now to FIG. 7, therein is shown a flow measurement system 700 for measuring the transit time of a gas flow. For convenience of illustration, like reference numerals are used in FIG. 7 to denote like elements already described in FIG. 4. The system 700 includes a pneumotachometer 400 having first and second annular ring transducers 408 and 410 constructed in accordance with the present invention. The system 700 also includes a microcomputer 708, a pulse generator 710, two send/receive switches 712 and 714, two amplifiers 716 and 718, two filters 720 and 722, two signal detectors 724 and 726, and two time measurement devices 728 and 730. The output of the microcomputer 708 is coupled to the input of the pulse generator 710. The output of the pulse generator 710 is coupled to the inputs of the send/receive switches 712 and 714. The output of the send/receive switch 712 is coupled to the second annular ring transducer 410 and is also coupled to the input of amplifier 716. The output of the amplifier 716 is coupled to the input of the filter 720. The output of the filter 720 is coupled to the input of the signal detector 724. The output of the signal detector 724 is coupled to the input of the time measurement device 728. The output of the time measurement device 728 is coupled to the microcomputer 708. Similarly, the output of the send/receive switch 714 is coupled to the first annular ring transducer 408 and is also coupled to the input of the amplifier 718. The output of the amplifier 718 is coupled to the input of the filter 722. The output of the filter 722 is coupled to the input of the signal detector 726. The output of the signal detector 726 is coupled to the input of the time measurement device 730. The output of the time measurement device 730 is coupled to the microcomputer 708. A temperature sensor 732 has its input coupled to the pneumotachometer 400 for measuring the temperature of pneumotachometer 400. The output of the temperature sensor 732 is coupled to the microcomputer 708.

In operation, a gas flow 424 of velocity V propagates through the pneumotachometer 400. The microcomputer 708 sends a signal to the pulse generator 710 for generating a short pulse of about 20 μs, and of a high amplitude in order to maximize the received signal and therefore increase the signal to noise (S/N) ratio. The short pulse is applied to the two send/receive switches 712 and 714. Send/receive switches 712 and 714 are unidirectional, in that they isolate the pulse generator 710 from the annular ring transducers 408 or 410 in the receive mode. The delayed signal from each annular ring transducer (408 or 410) contains the transit time information, which can be used to obtain the required time differential. The delayed signals are coupled to the inputs of amplifiers 716 and 718 via their respective inputs.

Similar to what was illustrated in equation (5) above, it can be shown that the differential time Δt of a pneumotachometer having annular ring transducer is $$\Delta t = \frac{2D\cos\Theta}{V_{us}^2} V \tag{8}$$

where D is the distance between the angled transducer faces of the two annular ring transducers 408 and 410, Θ is angle of the angled transducer face, $V_{us}$ is the velocity of the ultrasonic pulses, and V is the velocity of the gas flow 424 through the pneumotachometer 400.

The measurement technique consists of determining the time difference between two counterpropagating ultrasonic wave pulses, modulated by a unidirectional gas flow velocity vector as described in FIG. 2 (PRIOR ART). That time differential is proportional to the flow velocity V, as indicated by Equation (8).

The delayed signals are amplified by amplifiers 716 and 718, and then high pass (HP) filtered through filters 720 and 722. The outputs from the filters 720 and 722 are fed to the two signal detectors 724 and 728 which are used to measure the transit times of the ultrasonic pulses from the first annular ring transducer 408 to the second annular ring transducer 410 and vice versa. These transit times are measured by two time measurement devices which are counters operating at about 100 MHz. The microcomputer 711 calculates the differential transit time and estimates the velocity according to Equation (8) and the flow by integration over a definite period of time.

The temperature sensor 732 provides to the microcomputer 708 the temperature of the pneumotachometer 400 during a particular transit time measurement. By taking into consideration the temperature variations of the pneumotachometer 400, the accuracy of the flow rate computation can be enhanced.

V. A Second Embodiment of Flow Measurement System Using a Pneumotachometer With Annular Ring Transducers The second embodiment describes another aspect of the invention—a novel and accurate flow measurement system for measuring transit time using a pneumotachometer having annular ring transducers described in FIG. 4. A significant advantage of this embodiment is the measurement of a period—a measurement that can be made very accurately and reliably. The measured period is then used to compute V.

Figure 8:
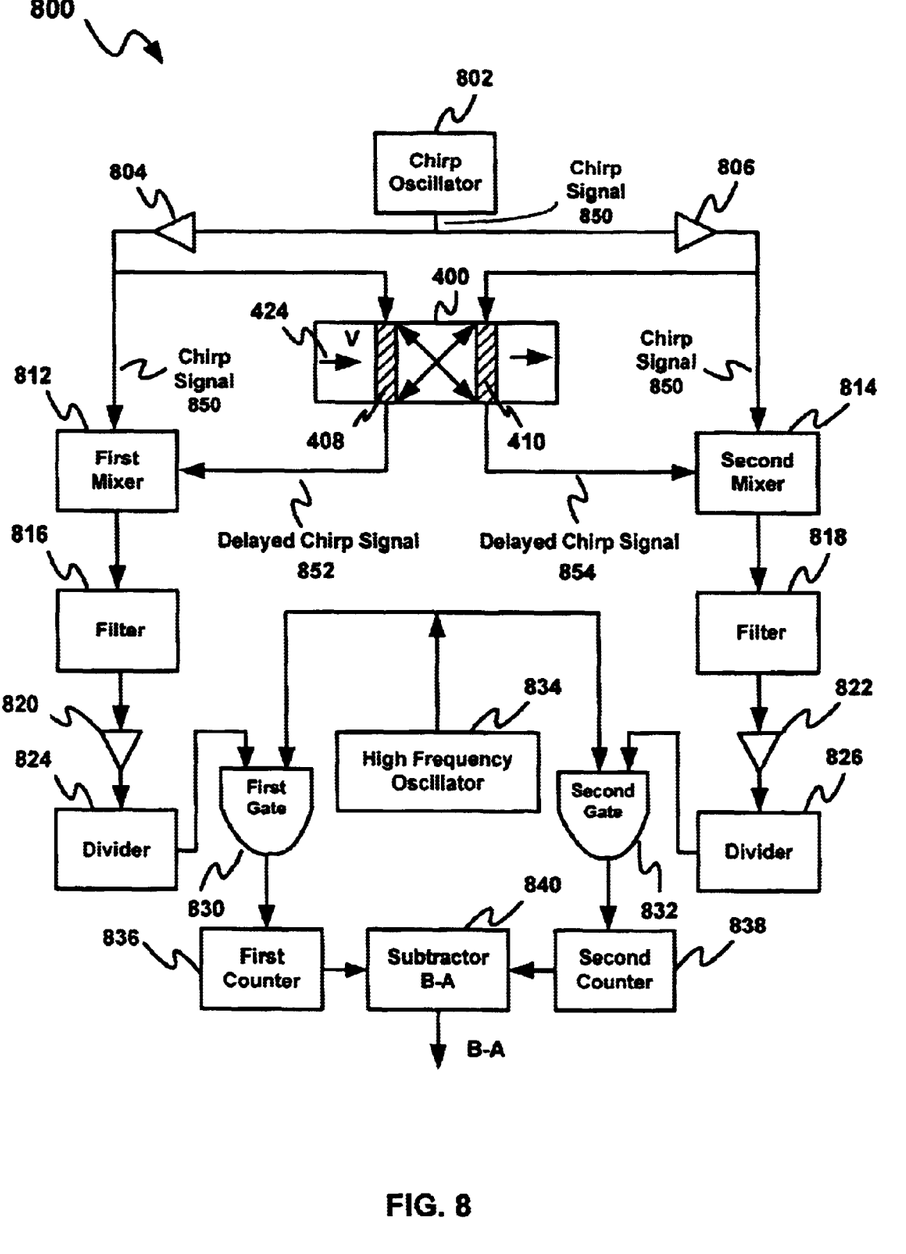
FIG. 8 is a second embodiment illustrating a flow measurement system using a pneumotachometer having annular ring transducers constructed in accordance with the present invention.

Referring now to FIG. 8, therein is shown a flow measurement system 800 for measuring the transit time of a gas flow. For convenience of illustration, like reference numerals are used in FIG. 8 to denote like elements already described in FIG. 4. The system 800 includes a pneumotachometer 400 having a first and second annular ring transducer 408 and 410 constructed in accordance with the present invention. The system also includes a chirp signal oscillator 802, buffers 804 and 806, a first mixer 812, a second mixer 814, a first filter 816 and a second filter 818, a first amplifiers 820 and a second amplifier 822, a first divider 824, a second divider 826, a first gating circuit 830, a second gating circuit 832, a high frequency oscillator 834, a first counter 836, a second counter 838, and a subtractor 840. The chirp signal oscillator 802 is coupled to the first and second annular ring transducers 408 and 410. The first mixer 812 has its input coupled to the output of buffer 804, which has its input coupled the chirp oscillator 802 and the first annular ring transducer 408. The first filter 816 is a bandpass filter and has its input coupled to the output of the first mixer 812, which has its output coupled to a the input of a first amplifier 820. The output of the first amplifier 820 is coupled to the input of the first divider 824. The output of the first divider 824 is coupled to the input of first gating circuit 830. The high frequency oscillator 834 has its output coupled to the input of the first gating circuit 830. The output of the first gating circuit 830 is coupled to first counter 836. The output of the first counter 836 is coupled to one of the inputs of the subtractor 840. Similarly, the second mixer 814 has its input coupled to the output of buffer 806 which has its input coupled the chirp oscillator 802 and the second annular ring transducer 410. The second filter 818 is a bandpass filter and has its input coupled to the output of the second mixer 814, which has its output coupled to a the input of a second amplifier 822. The output of the second amplifier 822 is coupled to the input of the second divider 826. The output of the second divider 826 is coupled to the input of the second gating circuit 832. The high frequency oscillator 834 has its output also coupled to the input of the second gating circuit 832. The output of the second gating circuit 832 is coupled to the second counter 838. The output of the second counter 838 is coupled to the other one of the inputs of the subtractor 840.

Unlike the prior art, the annular ring transducers 408 and 410 of pneumotachometer 400 in this embodiment are excited by a chirp signal. The chirp signal sweeps linearly from frequencies $f_a$ to $f_b$ in time T, and consequently the chirp rate: $R=[f_b-f_a]/T$ MHz/sec.

Since the annular ring transducers 408 and 410 are firing at an angle to the gas flow velocity vector V, the transit times $T_{12}$ and $T_{21}$, have to be calculated by resolving the gas flow velocity vector V, in the direction of the ultrasound $V_{us}$, as done previously in FIG. 4.

$$\text{Transit Time } T_{12} = \frac{D}{V_{us} - V\cos\Theta} \quad (9)$$

$$\text{Transit Time } T_{21} = \frac{D}{V_{us} + V\cos\Theta} \quad (10)$$

In operation, a chirp signal 850 is generated by the chirp signal oscillator 802. The chirp signal 850 is applied directly to the first and second mixers 812 and 814 through buffers 804 and 806, respectively, and simultaneously to the first and second annular ring transducers 408 and 410. The chirp signal 850 that is applied to the second annular ring transducer 410 generates an ultrasonic chirp signal that propagates through the gas in the pneumotachometer 400, and consequently is delayed in time. The first annular ring transducer 408 detects this ultrasonic chirp signal and converts it into an electrical second delayed chirp signal 852. The output of the first annular ring transducer 408 is then applied to the input of the first mixer 812. At this point the first mixer 812 sees two inputs—the chirp signal 850 directly from the chirp signal oscillator 802 and a second delayed chirp signal 852. Similarly, the second mixer 814 sees the chirp signal 850 directly from the chip signal oscillator 802 and a first delayed chirp signal 854. The first delayed chirp signal 854 and the second delayed chirp signal 852 are different due to the transit time differences as indicated above by $T_{12}$ and $T_{21}$.

Since the first and second mixers 812 and 814 are inherently nonlinear devices, their outputs contain a multitude of sum and difference frequencies. The first and second filters 816 and 818 are used to isolate the desired signals that are in the difference frequency located at the low end of the frequency spectrum.

Figure 9:
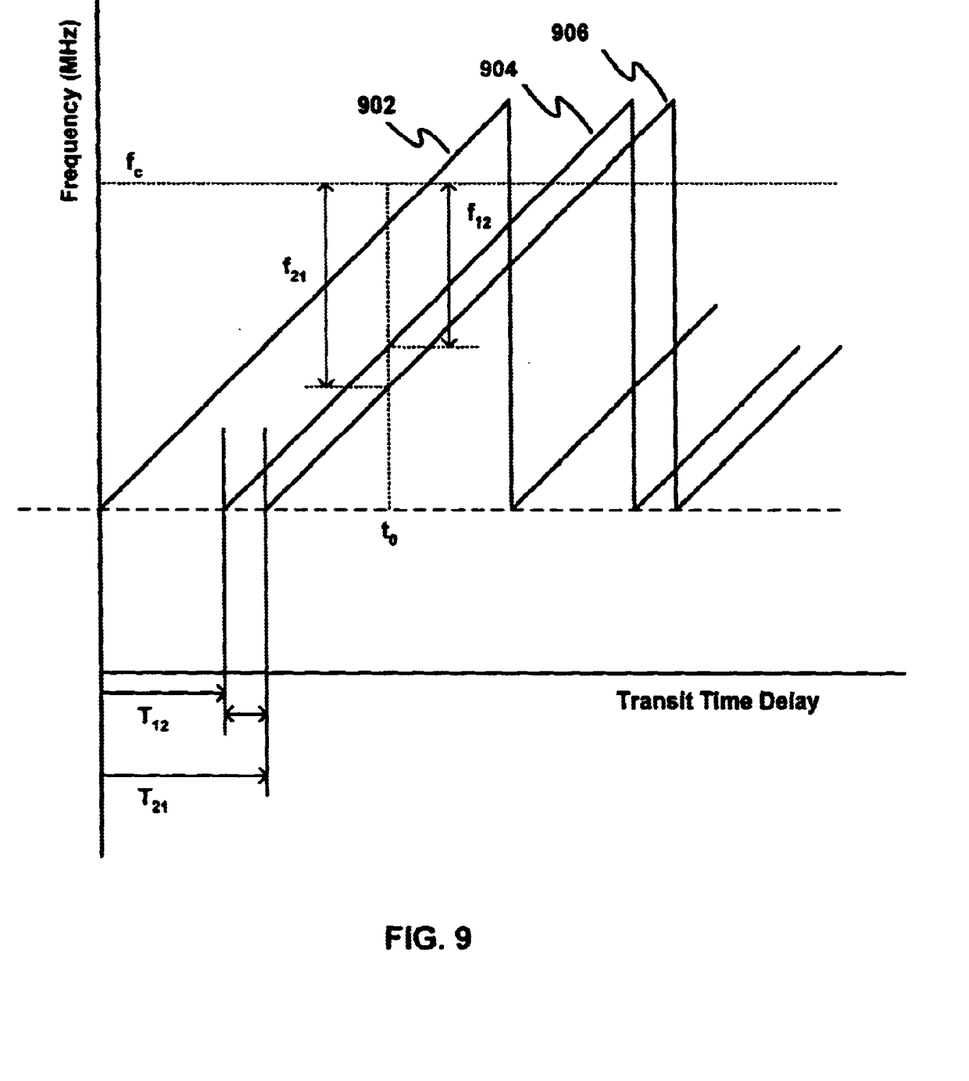
FIG. 9 is a graphical representation of the inputs to the first and second mixers 812 and 814 of FIG. 8.

Referring now to FIG. 9, therein is shown a graphical representation of the inputs to the first and second mixers 812 and 814. The y-axis is frequency in MHz, and the x-axis is the transit time delay. Graph 902 is the chirp signal 850 that is applied directly to the first and second mixers 812 and 814. Graph 904 is the first delayed chirp signal 854 that is applied to the second mixer 814. Graph 906 is the second delayed chirp signal 852 that is applied to the first mixer 812. Accordingly, the input to the first mixer 812 includes the chirp signal 850 (902) directly from the chirp signal oscillator 802, and the second delayed chirp signal 852 (906) in transit from the second annular ring transducer 410 to the first annular ring transducer 408. The output of the first mixer 812 is a frequency in MHz, which is proportional to the transit time of the chirp signal in going from the second annular ring transducer 410 to first annular ring transducer 408 through the pneumotachometer 400. Similarly the output of the second mixer 814 is another frequency that is proportional to the transit time from the first annular ring transducer 408 to the second annular ring transducer 410 through the pneumotachometer 400. The difference between these frequencies is small, and depends on the gas flow velocity V. When there is no flow, the frequencies are identical.

Referring again to FIG. 8, the circuitry beyond the first and second filters 816 and 818 measures the period differential corresponding to the above mentioned frequencies. Consequently, the circuitry includes a high frequency (stable) oscillator 834, first and second gating circuits 830 and 832, and first and second counters 836 and 838 to record a first number (A) and a second number (B) of clock cycles of the oscillator frequency at the output of the first and second gating circuits 830 and 832. Corresponding to a finite flow velocity in the pneumotachometer 400, the counts in the first and second counters 836 and 838 will be different. The output of the subtractor 840 is the difference of the two counts (B-A) and is proportional to the gas flow velocity V. When the flow is zero the counts are identical, save for the case of one +/- count.

The first and second dividers 824 and 826 perform division by N which is used to increase the clock cycle counts, and consequently the time resolution. The output of the divider 824 (or 826) is naturally a lower frequency. The input to the first and second gating circuits 830 and 832 consists of two frequencies—one fixed at $F_0$ which is at a frequency of about 10 MHz to about 100 MHz, and the other, a function of the gas flow.

With reference to FIG. 9, consider an arbitrary moment in time $t_0$, and the corresponding frequency $f_c$ on the graph 902 which represents the chirp signal 850 being applied directly to the first and second mixers 812 and 814. When the chirp signal 850 traverses the pneumotachometer 400, it gets delayed by $T_{21}$, in going from second annular ring transducer 410 to first annular ring transducer 408. Similarly, the chirp signal 850 gets delayed by $T_{12}$ when it traverses from first annular ring transducer 408 to second annular ring transducer 410. At that time $t_0$, two frequencies $f_{21}$ and $f_{12}$ can be identified that uniquely define the gas flow velocity V.

The first and second mixers 812 and 814 multiply the chirp signal 850 and the delayed chirp signals 852 and 854, and output a multiplicity of sum, difference and cross products. The first and second filters 816 and 818 are used to select the desired difference frequency components.

Consequently, $$\text{Output of the first filter 816} = RT_{21} = \frac{RD}{V_{us} - V\cos\Theta} = f_{21} \quad (11)$$

$$\text{Output of the second filter 818} = RT_{21} = \frac{RD}{V_{us} + V\cos\Theta} = f_{12} \quad (12)$$

where R is the chirp rate in MHz/sec.

$$\text{Output of the first divider 824} = \frac{f_{21}}{N} \quad (13a)$$

$$\text{Output of divider the second divider 826} = \frac{f_{12}}{N} \quad (13b)$$

For finite gas flow velocity V, $f_{21} \neq f_{12}$

Frequencies given by equation (13a) and (13b) enter their respective gate circuit. In each case, the gate width is proportional to the output of the respective dividers. Using the high frequency oscillator 834, the first and second counters 836 and 838 output the respective number of clock cycles corresponding to the gate width.

$$\text{Input to first counter 836 is a number} = \frac{F_0}{\frac{f_{12}}{N}} = A$$

$$\text{Input to second counter 838 is another number} = \frac{F_0}{\frac{f_{12}}{N}} = B$$

The outputs of the two counters are subtracted to obtain the period differential (B−A), which is proportional to the flow velocity V.

$$\text{Output of subtractor 840} = (B - A) = \frac{F_0}{\frac{f_{12}}{N}} - \frac{F_0}{\frac{f_{21}}{N}} = NF_0\left[\frac{1}{f_{12}} - \frac{1}{f_{21}}\right] \quad (14)$$

Substituting for $f_{21}$ and $f_{12}$ (equation (11) and (12)), we get, $$(B - A) = \frac{2NF_0\cos\Theta}{RD}V \quad (15)$$

Accordingly, by obtaining the value of B−A, the gas flow velocity V can be determined.

There are two advantages of using the chirp technique over the time interval technique of the prior art. First, using a chirp signal in the configuration shown in FIG. 8 produces two frequencies $f_{12}$ and $f_{21}$ that are relatively close. Therefore, narrow band filters (such as first and second filters 816 and 818) may be employed to improve the signal to noise ratio. Determining the edge of a pulse in a time delay system requires wideband circuitry. Using signal averaging to improve the signal to noise ratio is one way to recover some accuracy, however, that is usually more complex and costly than the technique disclosed in the present invention.

Second, the present invention measures upstream and downstream delays simultaneously, whereas the prior art time delay systems usually measure the upstream and downstream delays alternately. If the flow is uneven, a simultaneous measurement in accordance with the present invention will provide a more accurate result.

Therefore, the present invention provides an accurate and reliable pneumotachometer with annular ring transducers for determining the velocity of a fluid flow. Furthermore, the present invention provides a novel and accurate flow measurement system for measuring the transit time of a fluid flow using annular ring transducers constructed in accordance with the present invention.

While the best mode utilizes gas flow as examples, it should be understood that the present invention is applicable to fluid flow in general, including liquid flow.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations which fall within the spirit and scope of the included claims. All matters set forth herein or shown in the accompanying drawings are to be interpreted in an illustrative and non-limiting sense.

The invention claimed is:

1. A method for fabricating an annular ring transducer, comprising the steps of:

providing a cylindrical piece of piezoelectric member;

removing an outer portion of said piezoelectric member to form a slanted outer face that is approximately 45 degrees, said slanted outer face is located at a distance from the center of said cylindrical piece;

removing a center portion of said piezoelectric member, said center portion having a radius smaller than said distance;

removing an inner portion of said piezoelectric member to form a slanted inner face that is approximately 45 degrees, wherein a portion of said piezoelectric member positioned between said slated outer face and said slanted inner face formed an angled ring transducer with a thickness t, where t is given by f=V/2 t, and where f is a resonant frequency of the annular ring transducer, and V is an ultrasonic velocity of propagation in said piezoelectric member;

forming a layer of base material over said slanted inner face and said slanted outer face;

forming a layer of matching material over said base material layer;

heating said piezoelectric member to a first temperature below a Curie temperature of said piezoelectric member;

applying a voltage to said slanted inner face and said slanted outer face;

heating said piezoelectric member at a second temperature that is less than said first temperature; and allowing said piezoelectric member to cool down to room temperature while applying said voltage to said slanted inner face and said slanted outer face.

2. The method as claimed in claim 1 wherein said piezoelectric member comprises lead titanate zirconate piezoelectric material.

3. The method as claimed in claim 1 wherein said base material comprises chrome.

4. The method as claimed in claim 1 wherein said matching material comprises gold.

5. The method as claimed in claim 1 wherein said voltage is approximately 60 volts per t, where t is expressed in thousandths of an inch.

* * * * *